(12) United States Patent
Hadden et al.

(10) Patent No.: US 8,312,552 B1
(45) Date of Patent: *Nov. 13, 2012

(54) METHOD AND SYSTEM FOR RENDERING WATERMARKED CONTENT

(75) Inventors: Allen D. Hadden, Marlborough, MA (US); Christopher A. Hebert, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1117 days.

This patent is subject to a terminal disclaimer.

(21) Appl. No.: 11/796,835

(22) Filed: Apr. 30, 2007

Related U.S. Application Data

(63) Continuation-in-part of application No. 11/300,954, filed on Dec. 15, 2005.

(51) Int. Cl.
*G06F 21/24* (2006.01)

(52) U.S. Cl. .............. 726/26; 726/27; 713/176

(58) Field of Classification Search .............. None
See application file for complete search history.

(56) References Cited

U.S. PATENT DOCUMENTS

| | | | |
|---|---|---|---|
| 5,488,664 A | 1/1996 | Shamir | |
| 5,644,682 A | 7/1997 | Weinberger et al. | |
| 6,289,450 B1 | 9/2001 | Pensak et al. | |
| 6,298,446 B1 * | 10/2001 | Schreiber et al. | 726/27 |
| 6,339,825 B2 | 1/2002 | Pensak et al. | |
| 6,389,151 B1 | 5/2002 | Carr et al. | |
| 6,396,594 B1 | 5/2002 | French et al. | |
| 6,538,660 B1 | 3/2003 | Celi, Jr. et al. | |
| 6,718,334 B1 * | 4/2004 | Han | 1/1 |
| 6,922,693 B1 | 7/2005 | Rubin et al. | |
| 6,970,259 B1 | 11/2005 | Lunt et al. | |
| 7,164,779 B2 | 1/2007 | Yerazunis et al. | |
| 7,242,406 B2 | 7/2007 | Robotham et al. | |
| 7,472,272 B2 | 12/2008 | Stamos et al. | |
| 7,559,034 B1 | 7/2009 | Paperny et al. | |
| 7,664,956 B2 * | 2/2010 | Goodman | 713/176 |
| 2003/0038820 A1 | 2/2003 | Purpura | |
| 2003/0196093 A1 | 10/2003 | Raley et al. | |
| 2003/0202213 A1 | 10/2003 | Saito | |
| 2004/0240703 A1 | 12/2004 | Cohen et al. | |
| 2005/0068582 A1 | 3/2005 | Ferlitsch | |
| 2008/0025645 A1 | 1/2008 | Jakobson et al. | |

OTHER PUBLICATIONS

Stewart, "Adding dynamic stamps to PDFs when printing", Jan. 2001.*

PageVault, PageVault Administrator Users Guide, Copyright 1999 by Authentica Security Technologies Incorporated, Modified Jun. 1999.

Non-Final Office Action for U.S. Appl. No. 11/796,911 dated Sep. 3, 2010, pp. 1-29.

(Continued)

*Primary Examiner* — Minh Dinh

(74) *Attorney, Agent, or Firm* — Dergosits & Noah LLP; Todd A. Noah

(57) ABSTRACT

Methods and systems for rendering watermarks in a computer system are provided. One technique renders a content unit based on a call from an application, and renders a watermark for the content based on a call from a tool separate from the application. Another technique for rendering a watermark for content displayed on a display screen renders the content via a content window on the display, and renders the watermark via another window on the display that overlays at least a portion of the content window.

19 Claims, 7 Drawing Sheets

OTHER PUBLICATIONS

Final Office Action for U.S. Appl. No. 11/796,911 dated Feb. 10, 2011, pp. 1-30.
EMC Corporation, EMC Documentum Information Rights Management (IRM), White Paper, Oct. 2009.
EMC Corporation, How to Use Your IRM Client for Microsoft Office, V4.7.0, Mar. 2010.
S. Stewart, "Adding Dynamic Stamps to PDFs When Printing", Jan. 2001.

* cited by examiner

```
Options begin_options
Version(1)
TopMargin (12)
BottomMargin (12)
LeftMargin (0)
RightMargin (0)
end_options

--        Item -- begin_message
Name (Left Header)
StartPage (0)
EndPage (-1)
Size (12)
Color (0)
Text (%x, %X)
Position (top)
Justification (left)
Underlay (no)
end_message
```

```
--           Item -- begin_message
Name (Watermark)
StartPage (0)
EndPage (-1)
Size (14)
Color (50)
Text (Confidential)
Position (diag-topleft)
Justification (left)
Underlay (yes)
end_message
```

*FIG. 4*

| Parameter | Required | Definition | Values | Default |
|---|---|---|---|---|
| Name | Yes | Identifies the wm Item | Text | New Item |
| StartPage | Yes | First Page to wm | Numeric or -1 for Last Page | 1 |
| EndPage | No | Last page to wm | Numeric or -1 for Last Page | -1 |
| Size | No | Point Size of Message Text | Numeric | 12 |
| Color | No | Color of Message Text | 0 for Black, 100 for White, 1-99 for Shades of Gray | 0 |
| Text | Yes | Information to wm on the PDF Pages | Text Variables | None |
| Position | No | Page Location Where Text will be wm | Top, Bottom, diag-topleft, diag-bottomleft | Top |
| Justification | No | How Text will be Aligned | Left, Center, Right | Center |
| Underlay | No | Whether Text will be wm Under (Underlay) or Over (Overlay) PDF Text | Yes to Underlay or no to Overlay | Yes |

FIG. 5

| Variable | Format | Example |
|---|---|---|
| %A | full weekday name | Friday |
| %a | abbreviated weekday name | Fri |
| %B | full month name | October |
| %b | abbreviated month name | Oct |
| %c | local date and time | 10/01/98 05:00:00 |
| %d | day of month | 15 |
| %G | total number of pages | 20 |
| %g | number with which to begin page numbering | 2 |
| %H | hours, 00-23 | 13 |
| %I | hour, 01-12 | 01 |
| %i(<info field name>) | PDF info dictionary value: Author, Title, Subject, Keyword, Creator | Sample.pdf, Jane Smith, Security |
| %j | day of the year, 001-366 | 099 |
| %M | minutes, 00-59 | 25 |
| %m | month, 1-12 | 10 |
| %N | PDF filename | Sample.pdf |
| %P | full PDF pathname (including filename) | c:/My Documents/Sample.pdf |
| %p | local equivalent of AM or PM | PM |
| %S | seconds, 00-61 | 10 |
| %U | week of the year, 01-53 where Sunday is the first day of the week | 36 |
| %W | numeric week of the year, 00-53 where Monday is the first day of the week | 36 |
| %w | numeric weekday, 0-6 where Sunday is 0 | 5 |
| %X | local time representation | 05:35:10 |
| %x | local date representation | 10/02/98 |
| %Y | year with century | 1998 |
| %y | year without century, 00-99 | 98 |
| %% | % | % |

FIG. 6

METHOD AND SYSTEM FOR RENDERING WATERMARKED CONTENT

RELATED APPLICATIONS

This application is a continuation-in-part of U.S. application Ser. No. 11/300,954, entitled "Method and System for Dynamically Generating a Watermarked Document during a Printing or Display Operation" and filed on Dec. 15, 2005, which is incorporated herein by reference, in its entirety.

COPYRIGHT STATEMENT

This application includes subject matter that is protected by copyright. All rights are reserved.

FIELD OF THE INVENTION

The present application relates generally to content protection using digital watermarking techniques.

BACKGROUND

The assignee previously developed a digital rights management solution (Authentica® PageRecall® platform) that allows a digital watermark to be placed on any or all pages of a document. The watermarking feature allows for a layer of additional security to be combined with the capabilities of digital rights management systems which can control which users can access a document, when users can access a document, and what actions (e.g., read, modify, print, etc.) users can perform on the document.

The solution allows for PDF documents registered with the digital rights management system to be modified in the memory of a viewing device such that an in-memory representation of the PDF document is modified to include a digital watermark. The PDF viewer can then render (e.g., display or print) the in-memory representation of the modified PDF document, resulting in the rendering of the document with the watermark.

BRIEF DESCRIPTION OF DRAWINGS

In the drawings, in which like reference numerals represent like elements:

FIG. 4 illustrates a representative watermark definition stored in the watermarking server according to one embodiment;

FIG. 5 illustrates a table including a set of parameters that may be used to create a message block for a piece of information that can be watermarked on one or more pages using a watermarking function according to one embodiment;

FIG. 6 illustrates a table including a set of watermark variables and their permitted values according to one embodiment;

DETAILED DESCRIPTION

Figure 1:
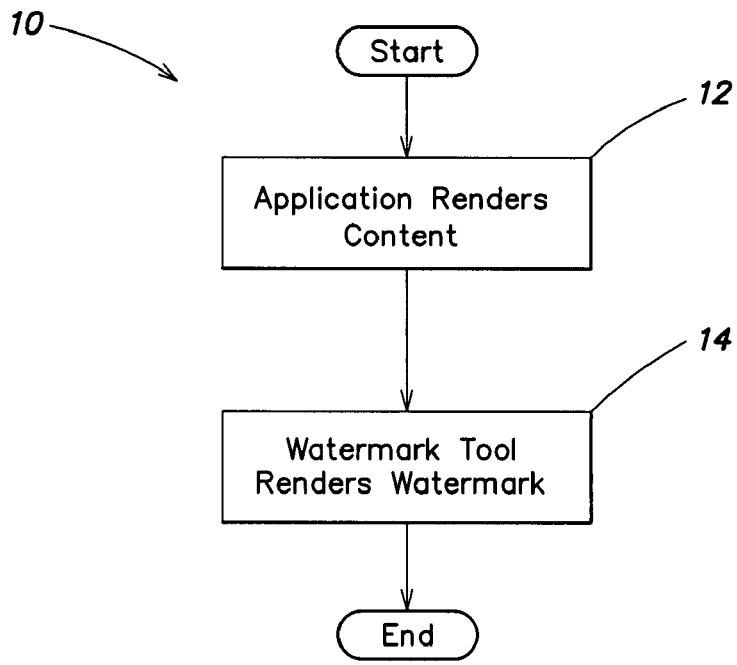
FIG. 1 is a process flow diagram illustrating how a watermark is rendered other than via the application that renders the content, according to one embodiment.

Applicants have appreciated that modifying the representation of content (e.g., a PDF document) in memory so that an application that renders the content (e.g., a viewing application, an application that generates the content, etc.) also renders the watermark may present some limitations with some applications. For example, when a watermark is to be imposed by a digital rights management (DRM) system, it may be desirable to implement the watermark in all views of the content rendered via an application, and to do so outside of the control of a user of the application so that the watermark cannot be removed by the user. Applicants have appreciated that while some applications (e.g., PDF viewers) may provide APIs that enable a DRM system to apply a watermark to content in a way (e.g., via an in-memory representation) that cannot be overridden or removed by the user of the application and appears in all views, other applications (e.g., those from the Office line of products from Microsoft Corp. of Redmond, Wash.) do not.

Applicants have appreciated that it would be desirable to provide a system that renders one or more watermarks associated with content separately from the application rendering the content. In this way, watermarks can be applied to content rendered from any desired application (including applications not natively compatible with rendering a watermark via a DRM system) outside of the control of the user of the application so that the watermark cannot be removed by the user and the content cannot be rendered without the watermark. The rendering operation may be of any type, including a print operation or a display operation.

In one embodiment, a technique is provided for rendering a watermark for content displayed on a display screen. The method comprises rendering the content via a window on the display, and rendering one or more watermarks via a transparent window that overlays at least a portion of the content window on the display. In another embodiment, a technique for rendering watermarks includes using function hooking to intercept one or more function calls to render content, and rendering a watermark with the content. The content to which a watermark may be applied can include any type of content that may be rendered (e.g., displayed or printed), including but not limited to textual objects, non-textual objects, or combinations thereof. Examples include word processing documents, formatted documents (e.g., PDF documents), spreadsheets, emails, calendar entries, presentations, image files, web-pages, reports created by report generating tools, and/or other types of electronic content.

The techniques presented herein can enable a digital watermark to be defined and applied in any suitable manner. In one embodiment, the watermark is defined centrally in a policy-based manner and then applied at an enterprise workstation "on-the-fly" (i.e., dynamically) as a content unit is being rendered (e.g., printed, displayed, or the like), e.g., by operating system resources. For illustrative purposes only, the watermark rendering aspect of some embodiments is described in the context of a workstation having a Microsoft® Windows® operating system platform such as Windows XP. The present techniques, however, are described in this context by way of example only; the watermark rendering techniques may be implemented in any operating system including, without limitation, UNIX, Linux, OS/X, or others. A representative machine or data processing system comprises a processor, an operating system, a set of input/output devices such as a display, a printer, or the like. The data processing system may be a standalone machine or connected to a network, such as a LAN, a WAN, the Internet, an intranet, or any other system. The data processing system may execute a host or calling application, such as Microsoft Word, Excel, or another application, from which a content unit is to be rendered (e.g., printed or displayed) by a rendering device such as a printer or video display.

A watermark "definition" may be created and stored in any suitable location. In some embodiments, the watermark is stored on a separate machine, typically a server, such as a dedicated watermarking server (or as a server process). The watermarking server may be a standalone machine or associated with another type of server. Thus, for example, in one embodiment the watermarking server is a server process that executes in association with a digital rights management (DRM) system, an example of which is the Authentica® Secure Documents' platform. That platform provides a digital rights management solution that protects information that is actively being revised or must otherwise remain in a native (e.g., Microsoft Office) format. Information is encrypted and persistently protected even while it is being accessed. In the Authentica system, a policy server enables a system administrator or other content owners to change and securely enforce user permissions (e.g., view, copy, forward, print or edit) and recall content units after they have been distributed. To access a protected content unit (which may be of any type) in such a system, the policy server provides a calling application plug-in with a decryption key and a policy that are then applied at the application to enable access to and use of a protected content. Further details regarding a digital rights management solution of this type are described in commonly-owned U.S. Pat. No. 6,289,450, the disclosure of which is incorporated herein by reference. It should be appreciated that the watermark rendering techniques described herein are not limited to use with the Authentica system, as they can be used with any system (e.g., other DRM systems) that render a watermark in any way and for any reason.

FIG. 1 is a flowchart of an illustrative process 10 for rendering a watermark separately from the application that renders a content unit in accordance with one embodiment. Process 10 may be performed in a computer system including a digital rights management system, or any other system that renders a watermark. As should be appreciated, process 10 need not be performed on solely one computer and can be distributed amongst multiple computers in a system.

Process 10 may be initiated in response to a user (e.g., interacting with a user interface of an application) attempting to access a content unit via the application. In response, the application may render the content (act 12). The rendering of the content may take any form, including displaying the content on a display screen (e.g., of the computer on which the rendering application is executed or on a remote display) or printing the content. The application may execute one or more function calls to render the content via the operating system of the viewing device. For example, the application may render the content via calls to system application programming interfaces (APIs), provided by the computer system on which the application executes, as described further below.

At any time, including before, after and/or during the rendering of the content, a watermark tool (e.g., executing on the viewing device or elsewhere) may render one or more watermarks for the content. The watermark tool may be any program that can render a watermark. In some embodiments, the watermark tool executes function calls via the operating system of the computer on which the content is being rendered to render a watermark based on a watermark definition, as described further below. The watermark definition may be provided by a policy server of a digital rights management system. However, it should be appreciated that the techniques presented herein are not limited in this respect, and that the watermark definition can be provided in any suitable manner. Upon rendering the content and the watermark(s) for the content, process 10 can terminate.

In some embodiments, the rendering of one or more watermarks for a content unit (e.g., via a watermark tool) may be transparent to the application rendering the content, so that the application rendering the content is not aware of the rendering of the watermark for the content. Alternatively, the application rendering the content could be made aware of the rendering of the watermark (e.g., via information sent by the watermark tool).

In some embodiments, the rendering of the watermark is outside the control of the application rendering the content, such that the rendering of the watermark cannot be influenced by the application or a user thereof. Thus, if, for example, the watermark is rendered under the control of a DRM system, the techniques used herein can ensure that if the DRM system calls for a watermark to be applied, neither the application rendering the content, nor a user thereof, can render the content without the watermark.

As discussed above, one use for the techniques described herein of rendering a watermark via a tool separate from the application that renders the content is to apply a watermark to content rendered by an application that provides no way to enable the rendering of a watermark outside of the control of the user of the application. However, the techniques desired herein are not limited in this respect, and can be used to render a watermark with any application, including those that may provide functions to enable a watermark to be rendered by the application. When the techniques described herein are used with such an application, watermarks may be rendered both by the application rendering the content and by a separate watermark tool as described herein.

As used herein, reference to a "tool" to render a watermark is not meant to imply any limitation on the nature of the watermark rendering system, as the reference to a tool is meant to cover any system (e.g., of hardware and/or software) capable of performing the functions described herein, including systems dedicated exclusively to performing this watermark rendering function, and systems wherein the watermark rendering functionality is integrated into a larger system having other functionality.

In some embodiments, the application rendering the content and the watermarking tool may execute on a client that is part of a computer system that includes a digital rights management system. The content unit being rendered by the application may be a protected content unit managed by the digital rights management system. In such embodiments, the digital rights management system may manage data or information defining the watermark for a content unit, as described further below.

It should be appreciated that process 10 is just one example of a process by which watermarks for content may be rendered. It should also be appreciated that the rendering of the content and the rendering of the watermark can be performed in any order, as the techniques presented herein are not limited in this respect. The above technique can be implemented in any suitable way. Two examples will now be described below, under separate headings, of illustrative implementations, but it should be appreciated that others are possible.

Hooking Function Embodiment(s)

As discussed above, one technique for rendering watermarks includes using one or more function hookings to intercept one or more function calls to render content, and rendering a watermark with the content.

Figure 2:
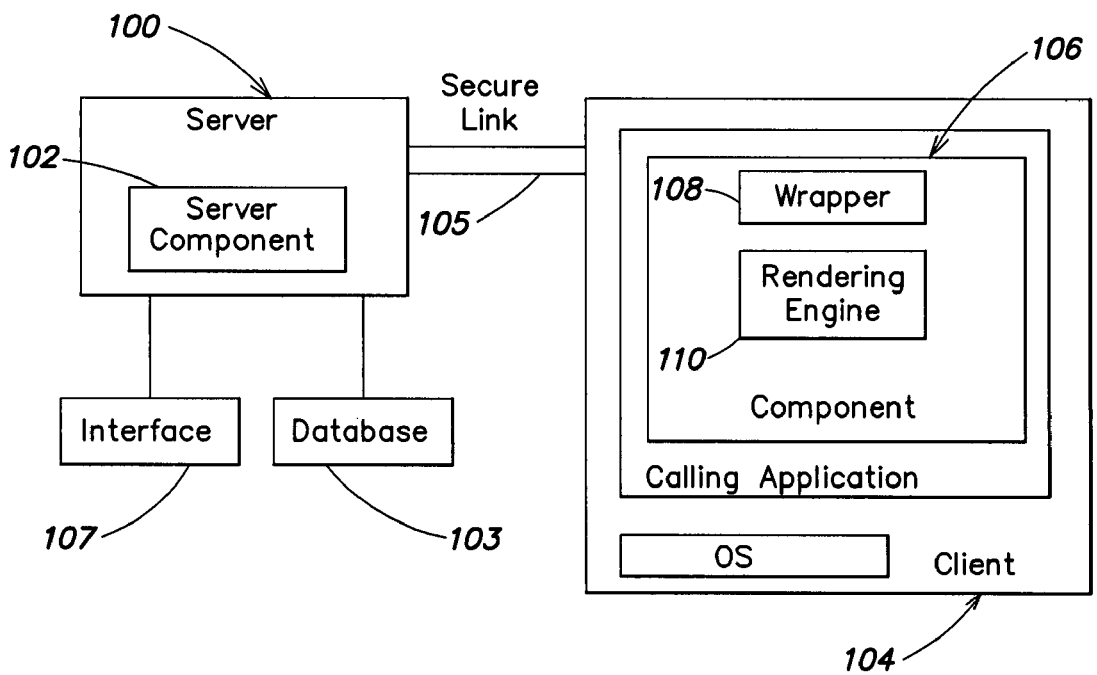
FIG. 2 is a block diagram of a system that provides a watermarking function according to one embodiment.

The hooking function embodiment may be implemented in any suitable manner. In one embodiment, it is implemented using a system including a set of components, as illustrated in FIG. 2. In the system of FIG. 2, a server 100 executes a server component 102, while a data processing machine 104 executes a client component 106. The server component 102 and client component may communicate over a secure link 105, e.g., via SSL, or TLS, or some other proprietary protocol. As will be seen, the information communicated from the server component to the client component may include a "watermark definition." This data may be used by the client to create a watermark "on-the-fly" as a given rendering operation takes place on the data processing machine. If a lesser degree of security can be tolerated, the client component 106 may communicate with the server as a Web service or in any other non-secure or semi-secure manner. It may be desired to have watermark data (e.g., the watermark definition) created and stored in the server and available to the client component on an as-needed basis only. This is sometimes referred to herein as a policy-based watermarking scheme. In a typical use case, an administrator defines a watermark centrally and associates a use policy therewith. When the policy is triggered, the watermark data is transmitted from the server component to the client component only when required (e.g., when a protected content unit is opened, or as a protected content unit is about to be rendered), and that watermark data preferably is retained in system memory (instead of stored on disk) at the machine 104. As will be described in more detail below, the server 100 may have or be associated with a database 103 in which the watermark data (a set of watermark definitions) is stored. In one embodiment, the data processing system also includes a graphical user or command line interface 107 that provides an administrator with the ability to design custom watermarks for use, for example, by authorized or permitted users, and to associate a given policy defining use conditions.

The watermark definition may be implemented in any suitable way (e.g., as a text file that describes the watermark as in some illustrative implementations described herein, as a script that is executed, e.g., on the client component, to produce the watermark, or in any other suitable manner).

In some embodiments, as described further below, the client component 106 has two functional modules, a wrapper component 108, and a watermark rendering engine 110. In operation, the client component 106 is loaded in any suitable way (e.g., a plug-in for the application may load the client component 106 when the application starts up or initiates a rendering (e.g., a print, a display) operation, another process may detect that the application program has been launched and can insert the client component 106 in a manner that is transparent to the application program, or in any other suitable manner). Upon loading, the client component is instantiated and hooks into one or more application programming interface (API) rendering (e.g., print or display) functions. This hooking function can enable the client component to intercept various function calls generated to the operating system by the calling application, and to take various actions thereafter, e.g., to securely retrieve information from the watermarking server from which the watermark is then created and rendered. As will be seen, these actions may be carried out transparently to the calling application, which may not be aware that the client component has taken over the printing or display process. It should be appreciated that this is just one example of components executing on a client, and other ways of implementing one or more of the techniques presented herein are possible. For example, for the transparent window embodiment described below in relation to FIG. 7, where a watermark is displayed via a transparent window, the client may execute an application program that issues calls to render the content and a separate watermark tool that issues calls to render the watermark. In such an embodiment, a wrapper component may not be present to hook calls from the application program. Alternatively, in one embodiment, different techniques for rendering the watermark may be used depending on the type of rendering operation (e.g., with the transparent window embodiment for rendering on a display and the hooking function embodiment for print) so multiple watermark rendering components to perform different types of watermark rendering may reside on the client.

By way of brief background, the Microsoft Windows operating system uses a graphics device interface (GDI) to enable applications to use graphics and formatted text on both a printer as well as a video display. Thus, Windows-based applications do not access graphics hardware directly; rather, the device interface typically interacts with device drivers on behalf of the calling application. The GDI print functions in Windows include, for example, functions such as CreateDC( ), StartDoc( ), StartPage( ), EndPage( ) and EndDoc( ) The CreateDC( ) function acquires a device context that can be used to draw to a printer device. The StartDoc( ) function starts a print job. The EndDoc( ) function ends a print job. The StartPage( ) function prepares the printer driver to accept data. The EndPage( ) function notifies the printer device that the application has finished writing to a page. This latter function is typically used to direct the device driver to advance to a new page. Different GDI functions are used to render information on a video display. In particular, the operating system notifies an application that portions of its display area need to be drawn, typically by sending the application a WM_PAINT notification message. The application typically responds to the WM_PAINT notification by calling GetDC( ) or GetDCEx( ) GDI function to acquire a device context that can be used to draw to the screen. After drawing is complete, the application calls the ReleaseDC( ) function.

Thus, in both printing and video display, a calling application can create or acquire a device context and use a set of rendering functions to render the desired content. According to some embodiments, this rendering process is enhanced through the inclusion of a watermark. The watermark may be created on-the-fly, from a watermark definition that is securely retrieved from the server component. Typically, the watermark itself is not stored in the database, although this is not a limitation. According to one illustrative embodiment, there are primarily two (2) different types of watermarks. As used herein, an "underlying" or "underlay" watermark is a watermark that is designed to be rendered under information before the information is rendered by printing or display. In contrast, an "overlying" or "overlay" watermark is a watermark that is designed to be rendered on top of or over information after the information is rendered. According to one embodiment, once a given printer or display device context has been created and is available for rendering, the client component securely retrieves a watermark definition from the server component, creates a watermark dynamically, and uses local resources (e.g., GDI functions) to write an underlay or overlay watermark. This process will now be described in more detail by reference to the process flow diagram shown in FIG. 3.

Figure 3:
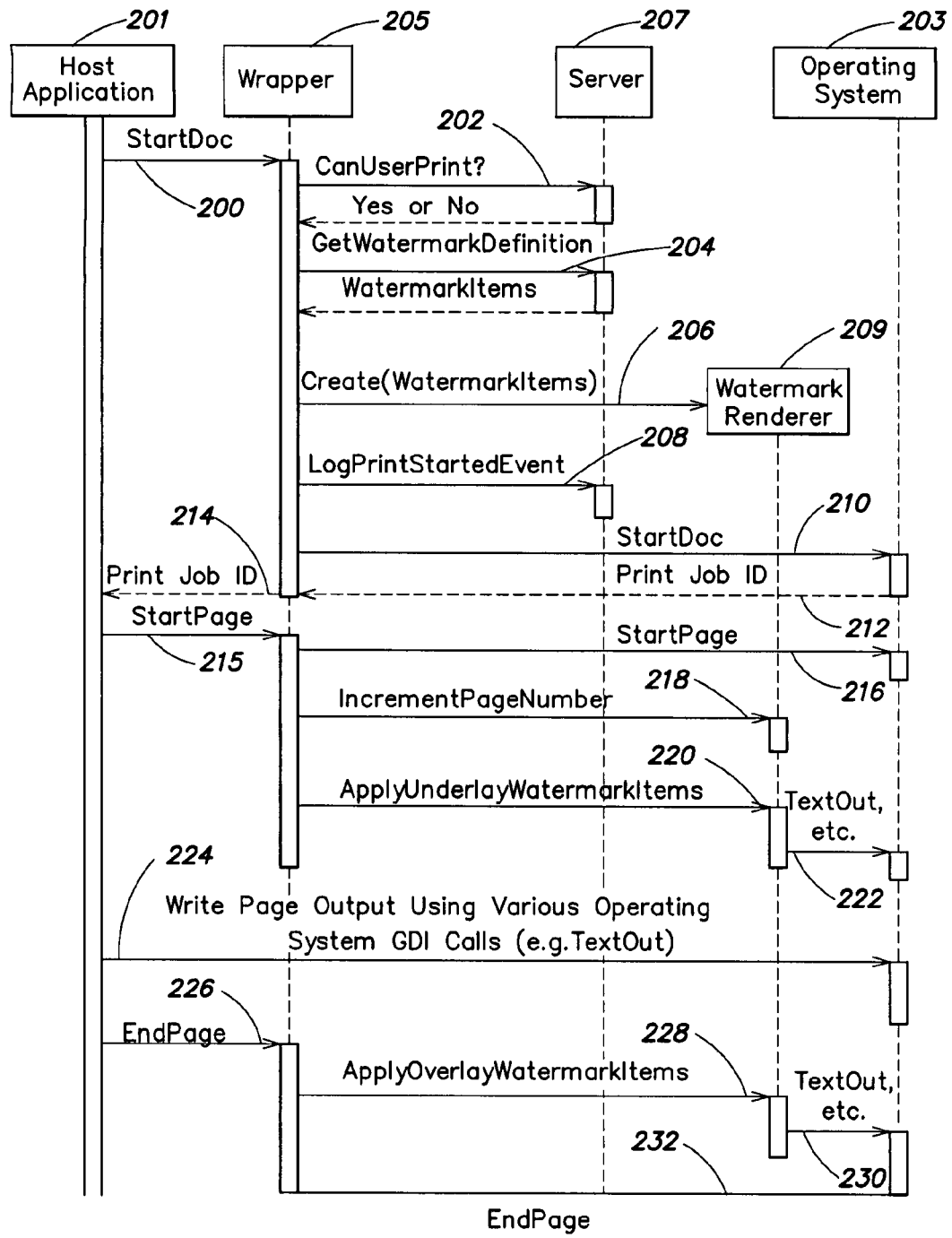
FIG. 3 is a process flow diagram illustrating how a watermark is generated using hooked functions according to one embodiment.

In the embodiment of FIG. 3, a host application 201 is assumed to be executing on an end user client machine having an operating system 203, and the wrapper code 205 has been instantiated. A watermarking server 207 has stored therein a watermark definition and is connectable to the end user client machine, preferably over a secure link. Watermark rendering code 209 is also instantiated in the end user client machine and waits for work.

The process typically begins when a user of the data processing system opens some content (e.g., a Word document, an Excel spreadsheet, a PowerPoint presentation, or the like) in the host application and initiates a given rendering (e.g., print or display) operation. Any calling application may use the present techniques, and the watermark may be applied to any type of content. For purposes of the following discussion, the techniques are described in the context of a printing operation for a document.

In a conventional print operation (i.e., where the client component is not present), the host application calls the StartDoc( ) API function at act 200. Because this API call has been hooked, however, the wrapper code of the present embodiment is invoked. In particular, the wrapper code intercepts the StartDoc( ) API function call transparently to the host application. In other words, as far as the host application is concerned, the StartDoc( ) API function is proceeding normally. At this point, the server component is contacted, preferably over a secure connection, and a determination is made regarding whether the user has authority to perform a print operation. This is act 202. In the alternative, as noted above, the watermarking server or process may be contacted to obtain the watermark definition when an application (or some plug-in associated therewith) first opens a given document to be rendered. In a digital rights management system, the application may need to obtain a decryption key and policy before it can open a given document; in such case, the watermark definition may be provided from the watermarking server process at the same time the application obtains the decryption key and policy, usually from a separate policy server. The determining act may be omitted if the user has already been authorized or authenticated through some other known means or mechanism (e.g., secure logon, user id and password checking, ACL checking, encryption, or the like).

If the outcome of any determination is positive, the wrapper code fetches a watermark definition from the server at act 204. As noted above, preferably this data is obtained over a secure connection and is not exposed to the calling application or the end user. The wrapper code then uses the watermark definition to create one or more watermarks, which are then passed to the watermark rendering code at act 206. At act 208, optionally the server is also notified by the wrapper code that the print operation has begun. The server can use this information for auditing or other administrative or management purposes, such as reporting on when a given watermark was supplied to a given document. At act 210, the wrapper code then passes the StartDoc( ) API function call to the operating system kernel. The operating system returns a print job identifier at act 212; thereafter, at act 214, this identifier is then passed back to the calling application. At this point, the semantics of the original StartDoc( ) API function call have been preserved.

The calling application then begins the print job, typically by printing a first page. To this end, the calling application issues a StartPage( ) function call to the operating system kernel. This function call is once again intercepted by the wrapper code, which has hooked the application's native print function. This is act 215. At act 216, the wrapper code forwards the StartPage( ) function call to the operating system kernel. It then increments a page number count at act 218. If the watermark definition retrieved from the server defines an "underlay" watermark, the wrapper code instructs the renderer code to draw the watermark at this time. This is act 220.

The renderer code then proceeds to draw what is, in effect, a "custom" watermark, as it is a watermark that has been created for this particular rendering operation. Preferably, the renderer code draws the watermark using the native GDI functions. This is act 222. Thus, for example, the renderer code generates the underlay watermark by passing to the operating system a TextOut( ) function call, which writes a character string at a specified location using a currently selected font, background color and text color, or a BitBlt( ) function call, which performs a bit-block transfer of color data corresponding to a rectangle of pixels, or calling whatever other underlying rendering function is required. The above are merely representative functions, of course. At act 224, after any underlay watermark is rendered, the host application writes the page output, also preferably using the available GDI operating system calls. This page output is written on top of any watermark drawn in act 222.

At act 226, the host application calls an EndPage( ) API function. The wrapper code also intercepts this function call. If the watermark definition retrieved from the server contains an "overlay" watermark, the wrapper instructs the rendering code to print this watermark at act 228. As described above, preferably the watermark renderer code calls the necessary GDI functions to draw the overlay watermark. This is act 230. At act 232, the original EndPage( ) function call is then passed from the wrapper to the operating system kernel to preserve the expected function call semantics. This completes the watermark rendering process.

Thus, as can be seen, the wrapper code hooks into one or more calling application graphic device interface (GDI) function calls to securely retrieve centrally-defined watermark definition data that is then used locally to render a watermark.

Although not described in detail, one of ordinary skill in the art will appreciate that more than one watermark may be laid under or laid over given output information within a given printer or display device context. Of course, a given page may include both an underlay and an overlay watermark. A given watermark may comprise any given information (e.g., text, alphanumeric data, symbols, messages, graphics, images, or combinations thereof). The watermark rendering code may also include logic that applies a given mathematical or other function to given watermark data to create the watermark.

As noted above, hooking techniques presented herein are not limited to dynamic watermarking during a print operation. As noted above, one or more techniques may also be used to provide "on-screen" watermarking during a display operation. In one embodiment, to implement on-screen watermarks, the watermarks may be applied before (as an underlay) or after (as an overlay) as the calling application writes its output to the display device. This may be achieved by hooking an application's WM_PAINT notification message handler. Underlay watermarks are drawn before the WM_PAINT message is passed to the host application; overlay watermarks are drawn after the WM_PAINT message has been processed by the host application.

As noted above, the watermark definitions may be stored in a central database, with access thereto being managed by a server component over a secure link. This provides a policy-based watermark solution when the techniques are implemented in conjunction with or as part of a digital rights management solution. In this manner, neither the end user nor the calling application can easily interfere with the watermark process or tamper with the contents of the watermark itself. Preferably, as noted above, the watermark is maintained in-memory only in the machine that hosts the calling application. The server component, however, preferably receives information from the client component that enables the server to log the watermark created, the watermark creation time, whether the watermark was supplied under or over the rendered output, as well as the printer or display device content in which the watermark was supplied. A given watermark definition on the server may also be changed as a result of the connection that is established between a client computer and the server. In particular, additional "dynamic" information (e.g., user name, password, and/or IP address from which the client connects to the server, or other such information) may be substituted into the watermark definition and logged as necessary.

Thus, according to the centralized policy aspect of some embodiments, preferably a system administrator or other authorized entity defines the watermarks that may be rendered dynamically and when and how those watermarks are applied to end user client machines that are connectable to the server. In a representative digital rights management environment, watermarks are associated with data classifications, user policies, content policies, policy templates, or site or default policies. In one embodiment, a watermark comprises user-defined text that will appear on protected content when it is viewed or printed. In a typical use scenario, an administrator having secure access to the watermarking server creates a watermark definition by defining the watermark text, its color or shade characteristics (gray scale), translucency, as well as its position and orientation, e.g., top or bottom of a page, diagonally across a page, or the like. The watermark definition is then associated with or made a component of a user policy, a site policy, a default policy, or the like.

The watermarking function watermarks content with information that an authorized entity (e.g., an administrator) specifies in a data structure, referred to herein for convenience as a "watermark definition." The watermark definition may be a text file (or, more generally, a data structure) that contains margin settings, text to watermark, and formatting information for each watermark item. The administrator or other permitted entity can change a sample watermark definition or can create a custom watermark definition.

Typically, there is a watermark definition that includes a watermark item for each piece of information to watermark. Thus, a watermark may be represented internally in the system by a watermark definition. The parsing of the watermark text and processing of substitution variables may be based on a native application function. In a representative implementation, there are classes that take over the functionality of parsing a watermark description and formatting of watermarking text. Watermarking may also provide run-time variable substitution of information, such as user name, a content identifier (e.g., a document ID), server time, and the like. Similarly, conditional logic may be executed to control the content of the watermark, e.g., based on any number of environment conditions such date, time, software version, user or group, network address, or the like. A representative watermark definition is shown in FIG. 4.

Generalizing, a watermark definition can include margin settings and one or more watermarks. For example, it may be desired that a document have the date and time watermarked at the top of its pages and page numbers watermarked at the bottom of its pages. Or, the administrator might want to watermark different information on different page ranges. The information watermarked on the document pages is contained in message blocks. A message block contains the parameters for one piece of information that can be watermarked on one or more pages. A message block begins with the text begin_message on a line by itself. The message block contains required and optional information used to create and position the watermarked information. A message block ends with the text end message on a separate line. The table in FIG. 5 shows each of the parameters included in a representative message block. In addition, preferably there are a number of variables that can be used to format text to watermark. For example, the user might want to watermark the date and time on document pages. There are several date formats to choose from. These variables let the administrator indicate exactly how he or she wants the date to appear. FIG. 6 is a table showing representative variables for information such as dates, times, and page numbers. Preferably, each variable is case sensitive and has a specific format as indicated.

As noted above, preferably the server includes an administrative GUI or other CLI to enable an authorized entity to create a watermark definition and to apply that definition to a given policy that is enforceable by the digital rights management system. In a representative embodiment, the entity obtains authorized or permitted access and opens a watermark definition creation dialog. A display panel identifies existing watermark definitions or affords the user an opportunity to create a new watermark definition. In the latter case, the user identifies the new watermark definition, enters descriptive text, and creates the new definition. Suitable menus and display objects are useful for this purpose, although the particular details of any design GUI or CLI are not material to the present embodiments. Once the new watermark definition has been created, it is saved in the server database. Of course, there may be many servers and databases, and they may be connected in any convenient manner. In one alternative embodiment, the watermarking server is operated as a managed service that is available online, e.g., on the public Internet, or via a secure intranet.

The following provides additional details of a representative implementation.

Watermark Classes

The following watermark classes preferably are callable from a library and available to a client in accordance with one embodiment. However, these classes are illustrative and not limiting.

```
class WatermarkItem
{
public:
    enum Layer {Underlay, Overlay};
    enum Justification {Left, Center, Right);
    enum Position {Top, Bottom, DiagTopLeft, DiagBot-
        tomLeft};
    enum TextType {Outline, Filled);
    //
    //Callback to retrieve info about the document for for-
        matText( ).
    //Return false if error encountered or info item not
        found.
    //This will halt the formatText( ) processing.
    //
    typedef(bool*)DocInfoCallback(string    &infoName,
        string &infoval, void *cbParm);
    WatermarkItem( )
    virtual ~WatermarkItem( )
    void setName(string &name);
    void setText(string &text);
    void setPosition(Position pos);
    void setJustification(Justification just);
    void setStartPage(int startPage);
    void setEndPage(int endPage);
    void setSize(int size);
    void setColor(int color);
    void setTextType(TextType ttype);
    void setLayer(Layer layer);
```

```
    string getName(void);
    string getText(void);
    Position getPosition(void);
    Justification getJustification(void);
    TextType getTextType(void);
    Layer getLayer(void);
    int getStartPage(void);
    int getEndPage(void);
    int getSize(void);
    int getColor(void);
    //
    //Translate the watermark variables and replace
    //them with the appropriate values. Passing -1
    //for totalPages inhibits processing of % G.//
    //Passing -1 for curPageNum inhibits processing
    // of % g. Passing a null pointer for cb inhibits
    // processing of % i. Passing a null pointer for
    // fileName inhibits processing of % N. Passing a
    // null pointer for filePath inhibits processing of
    // % P. Variables that are not processed are replaced
    // with the empty string.
    //
    bool formatText(int totalPages, int curPageNum,
        DocInfoCaliback *cb, void *cbParm, string *file-
        Name, string *filePath, string &outText);
  private:
    string m_name;
    string m_text;
    Position m_position;
    Justification m_justification;
    TextType m_textType;
    Layer m_layer;
    int m_startPage;
    int m_endPage;
    int m_size;
    int m_color;
};
class WatermarkSet
{
  public:
    WatermarkSet(string &data);
    virtual ~WatermarkSet( );
    int getTopMargin(void);
    int getBottomMargin(void);
    int getLeftMargin(void);
    int getRightMargin(void);
    list<WatermarkItem> &getItems(void);
  private:
    list<WatermarkItem> m_items;
    int m_version;
    int m_topMargin;
    int m_bottomMargin;
    int ml_eftMargin;
    int m_rightMargin;
};
```

Print Watermarks

As noted above, the print watermarks may be generated by hooking the StartDoc, EndDoc, StartPage, and EndPage Windows API print functions. In StartDoc( ), the code determines if this is a protected document and if its policy includes watermarks. In StartPage( ), the code applies all watermarks whose Underlay setting is Yes. In EndPage( ), the code applies all watermarks whose Underlay setting is No. For watermarks whose Position setting is diag-topleft or diag-bottomleft, the code tiles the watermark text across and down each page and the Justification setting is ignored. Watermarks whose Position is top or bottom appear at the top or bottom, respectively, and their Justification settings are observed. The Outline, StartPage, EndPage, Size, and Color settings preferably are observed for print watermarks. To support outline, the notion of a path is used. In the GDI API, if BeginPath( ) is invoked and then TextOut( ) calls are followed by EndPath( ), the code converts the text into drawn lines. Invoking StrokePath( ) provides the text appearing in outline form; invoking StrokeAndFillPath( ) provides a non-outline form of the text. For non-outline, preferably both the GDI pen and brush are set to the same color.

Diag-topleft watermarks are very straightforward to achieve, e.g., by creating a logical font the baseline of which is at an angle of 45 degrees below the horizontal and to the right. Preferably, the code creates a path from the text with that orientation and determines its bounding rectangle. The code then creates replicant paths using the width and height of the rectangle as the step between starting points of the text in each path.

Diag-bottomleft watermarks are handled similarly to the diag-topleft type, with the logical font having a baseline that is at an angle of 45 degrees above the horizontal and to the right. The main difference in handling the tiling is that the starting points of the text must be the bottom left corner of the bounding rectangle rather than its top left corner.

In one embodiment for use with a system that renders watermarks only in black and white (or grey), color may be interpreted using a formula R=OxFF*color/100 and the same for G and B. This allows the choice of 101 of the 256 shades of grey possible. However, it should be appreciated that the techniques described herein are not limited to use with systems that render watermarks only in black and white, and can be used in connection with systems wherein red, green and blue values for the watermark can be specified and obtained separately. Thus, the references herein to the embodiment for use only with black and white watermarks are provided solely for purposes of illustration, as the techniques described herein for rendering a watermark are not limited in this respect.

The code preferably keeps track of the page count in a StartPage( ) hook; this allows support of a watermark page range as given by the StartPage and EndPage watermark definition settings.

The name and path of the file are available from the document involved.

Routines and Data Structures

The following are illustrative routines and data structures used to print watermarks dynamically according to some embodiments.

As described above, these routines are hooked to control printing. The hook calls AllowsPrint( ), which is a routine, internal to this embodiment, that checks the print option for the document. Because the only parameter to EndDoc( ), StartPage( ), and EndPage( ) is an HDC (device context handle), the code keys off that parameter to determine what, if anything, the StartPage( ) and EndPage( ) hooks should do.

The code passes the HDC to AllowsPrint( ) and uses that device handle for registering the print watermark information. The information needed is the HDC, a WatermarkSet, a page counter, and a reference to the document object (alternatively, the function needs to cache built-in document properties, file name, and the file path). The WatermarkSet is the watermark definition, as described above. The class ASOWatermarkPrint contains these data and establishes a global map from the HDC to the ASOWatermarkPrint object for the document being printed.

```
struct ASOWatermarkPrint
{
    // A list of WatermarkSet that came from the server for
        the
    //"current" document
    list<WatermarkSet> m_wmarks;
    // The current state of the document (contains the file
    // name, path, document properties).
    ASOActiveDocumentState*m_state;
    // Reference to the current document. In this embodi-
        ment, the
    //current document is represented using a COM IDis-
        patchPtr
    // (this is how office documents are represented).
    IDispatchPtr m_theDoc;
    // The total number of pages in the document.
    int m_pageCount;
    // Constructor for ASOWatermarkPrint data structure
        (initializes
    // fields to their default values).
    ASOWatermarkPrint( );
    // Destructor for ASOWatermarkPrint data structure (de-
        stroys
    // allocated memory).
    ~ASOWatermarkPrint( );
    // Applies the watermark to the specified device context
        (HDC means
    // "handle to device context"). The caller
    // specifies which type of watermarks should be drawn
    //("overlay" or "underlay") through the "layer" param-
        eter.
    Apply(HDC dc, WatermarkItem::Layer layer);
    //Increments the page number.
    IncrPageNum(void);
    // Retrieves the current page number.
    int PageNum(void);
    // Registers the device context for printing (called from
    // the StartDoc wrapper). This creates a new ASOWater-
        markPrint
    //object that can be retrieved using the Lookup method.
    static Register(HDC dc, ASOActiveDocumentState
        *info, IDispatchPtr doc);
    //Unregisters the device context for printing (called from
    //the EndDoc wrapper).
    static Unregister(HDC dc);
    // Locates the ASOWatermarkPrint associated with the
        specified
    // device context.
    static ASOWatermarkPrint* Lookup(HDC dc);
};
// The map data structure that holds the HDC to ASOWa-
    termarkPrint mapping.
//New ASOWatermarkPrint objects are added to this map-
    ping through calls to
// ASOWatermarkPrint::Register. Objects are removed
    from this mapping
// through calls to ASOWatermarkPrint::Unregister.
map<HDC, ASOWatermarkPrint> g_wmarkPrints;
```

Registering the ASOWatermarkPrint object consists of adding an entry to the g_wmarkPrints map. It is at this point that the ASOWatermarkPrint object will be allocated. It should be appreciated that the determination of which watermark to apply can depend upon any of numerous factors (including the content being rendered and permissions relating thereto) and can be controlled by other aspects of the system (e.g., the DRM system) in any suitable manner, as the techniques described herein for rendering a watermark are not limited in any respect by the nature of the system that controls what type of watermark is to be rendered, nor to any particular techniques that can be used to retrieve the watermark.

```
    ASOActiveDocumentState *info= ...
    .
    .
    .
    if (bAllowPrint && dc !=0)
    {
        ASOWatermarkPrint::Register(dc, info, docPtr);
    }
    StartPage( )
```

The hook for this routine calls the original StartPage( ) routine and then looks up the ASOWatermarkPrint object using the HDC. If there is an ASOWatermarkPrint object registered for the HDC, the page count is incremented. If the watermark type is underlay and the page count is in range, the watermark is applied.

```
    ASOWatermarkPrint *wmark;
    // Call the OS StartPage function first.
    retVal=s_pfnStartPage(dc);
    // Find the ASOWatermarkPrint object that applies (if any).
    //This would have been registered in StartDoc.
    wmark=ASOWatermarkPrint:Lookup(dc);
    if (wmark !=0)
    {
        // Increment the page number so the rendering will
        // contain the correct page number.
        wmark->IncrPageNum( );
        // Draw any underlay watermarks to the print device.
        wmark->Apply(dc, WatermarkItem::Underlay);
    }
    return retVal;
    EndPage( )
```

The hook for this routine looks up the ASOWatermarkPrint object using the HDC. If there is an ASOWatermarkPrint object registered for the HDC, the watermark type is overlay and the page count is in range, the watermark is applied. Regardless of the state of watermarking, the original EndPage( ) routine will be called.

```
    ASOWatermarkPrint *wmark;
    // Find the ASOWatermarkPrint object that applies (if any)
        .//
    // This would have been registered in StartDoc.
    wmark=ASOWatermarkPrint::Lookup(dc);
    if (wmark !=0)
    {
        // Draw any overlay watermarks to the print device.
        wmark->Apply(dc, WatermarkItem::Overlay);
    }
    //Call the OS EndPage function now that we're done writ-
        ing
    // the overlay watermark.
    retVal=s_pfnEndPage(dc);
    return retVal;
    EndDoc( )
```

The hook for this routine looks up the ASOWatermarkPrint object using the HDC. If there is an ASOWatermarkPrint object registered for the HDC, the ASOWatermarkPrint object is unregistered, freeing all resources associated with it.

```
    // Unregister the ASOWatermarkPrint that was registered
        in StartDoc.
    ASOWatermarkPrint::Unregister(dc);
    // Call the OS EndDoc function.
    retVal=s_pfnEndDoc(dc);
    return retVal;
```

ApplyWatermarks( )

This routine iterates over all WatermarkSet objects to get all WatermarkItems. For each WatermarkItem whose underlay value matches that specified, its text is formatted and emitted via the HDC. The following code illustrates the mechanism.

```
    list<WatermarkSet>::iterator i;
    // Step through each Watermark that applies (they can come from
    // multiple places, so many may apply).
    for (i=m_state->w marks.begin( ); i !=m state->m wmarks.end( ) i++)
    {
        // Each Watermark is made up of 1 or more WatermarkItem objects.
        //Step through each one of these WatermarkItem objects and
        // draw them.
        list<WatermarkItem>::iterator item;
        for (item=i->GetItems( ).begin( ); item !=i->GetItems( ).end( ); item++)
        {
            // If the page is within the range specified in the WatermarkItem
            // and the layer(overlay or underlay) specified in the
            // WatermarkItem matches the value specified by the caller then
            // we will draw the watermark. If either of those conditions
            // is false, then the WatermarkItem object will be skipped.
            if (item->PageInRange(m_pageCount) && item->getLayer( )==layer)
            {
                int colorVal=255*item->getColor( )/100;
                COLORREF textColor=RGB(colorVal, colorVal, colorVal);
                int angle;
                int fontHeight;
                string itemText;
                bool fmtGood;
                string fileName;
                string filePath;
                int minX;
                int minY;
                int maxX;
                int maxY;
                int txtWid;
                int txtHgt;
                // Get the file name from the document (this might be
                // needed when rendering the watermark).
                fileName=getFileNameFromDoc(m_doc);
                // Get the file path from the document (this might be
                // needed when rendering the watermark).
                filePath=getFilePathFromDoc(m_doc);
                // Format the text to be displayed (store result in
                    "itemText")
                item->formatText(-1, m pageCount, getDocProperty,
                    this, fileName, filePath, itemText);
                // Determine the angle to use when creating the
                    font. The angle
                // to use depends on the positioning specified in the
                    WatermarkItem.
                if (item->getPosition( )==WatermarkItem::DiagTopLeft)
                {
                    angle=3150;
                }
                else if (item->getPosition( )==WatermarkItem::DiagBottomLeft)
                {
                    angle=450;
                }
                else
                {
                    angle=0;
                }
                // Calculate the height of the font (specified in the
                // WatermarkItem).
                fontHeight=pointSizeToLogical(dc, item->getSize( ));
                // Create the font, pen and brush objects needed to render
                // the text.
                font=CreateFont(fontHeight, 0, angle, angle, ... );
                pen=CreatePen(PS_SOLID, penWidth, textColor);
                brush=CreateSolidBrush(textColor);
                // Select the font, pen and brush into the context so they're
                // used by TextOut below.
                oldFont=SelectObject(dc, font);
                oldPen=SelectObject(dc, pen);
                oldBrush=SelectObject(dc, brush);
                // Set the background mode to be "transparent" so the bounding box of the
                // watermark text will be invisible
                //content won't get occluded by the watermark text.
                oldBackgroundMode=SetBkMode(dc, TRANSPARENT);
                // Determine the size of the bounding box.
                BeginPath(dc);
                status=TextOut(dc, 0, 0, itemText.c str( ), itemText.size( ));
                EndPath(dc);
                textRegion=PathToRegion(dc);
                GetRgnBox(textRegion, &textRect);
                txtWid=textRect.right-textRect.left;
                txtHgt=textRect.bottom-textRect.top;
                //
                //Emit the watermark
                //
                if(angle==0)
                {
                    //
                    // Observe justification and don't tile.
                    //
                    if(item->getPosition( )==WatermarkItem::Top)
                    {
                        minY=i->getTopMargin( );
                    }
                    else
                    {
                        minY=pageHeight-i->getBottomMargin( )-txtHgt;
                    }
                    if(item->getJustification( )==WatermarkItem::Left)
                    {
                        minX=i->getLeftMargin( );
                    }
                    else
```

```
{
    minX=pageWidth-i->getRightMargin( )-txt-
    Wid;
    if(item->getJustification( )==WatermarkItem::
    Center)
    {
    minX/=2;
    }
}
BeginPath(dc);
status=TextOut(dc, minX, minY, itemText.c-
_str( ), itemText.size( );
EndPath(dc);
if(item->getTextType( )==WatermarkItem::
Outline)
{
StrokePath(dc);
}
else
{
StrokeAndFillPath(dc);
}
}
else
{
// Tile and ignore justification.
minX=i->getLeftMargin( );
maxX=pageWidth-i->getRightMargin( );
minY=i->getTopMargin( );
maxY=pageHeight-i->getBottomMargin( );
for(eks=minX; eks<maxX; eks+=(textRec-
t.right-textRect.left))
{
for(why=minY; why<maxY; why+=(textRect-
.bottom-textRect.top))
{
BeginPath(dc);
status=TextOut(dc, eks, why, itemText.c str( ),
emText.size( ));
EndPath(dc);
if(item->getTextType( )==WatermarkItem::
Outline)
{
StrokePath(dc);
}
else
{
StrokeAndFillPath(dc);
}
}
}
}
}
}
}
```

It should be appreciated that details described above regarding how the watermark is rendered, the function calls executed when hooking, and other implementation details are just examples, as the technique described herein relating to intercepting one or more function calls to render content and rendering a watermark with the content are not limited to the above-described implementation techniques.

Transparent Window Embodiment(s)

One embodiment is directed to a technique for rendering a watermark via a transparent window on a display that overlays at least a portion of a window of the display wherein the content is rendered. The transparent window may be displayed over at least a portion of the application content window so that the user may perceive the watermark as being associated with the content unit. The process controlling the rendering of the watermark may ensure that whenever the content is rendered to a display, a transparent window with one or more watermarks is applied with the content.

The transparent window can take any suitable form, as the techniques described herein are not limited to implementing any particular type of transparent window. As used herein, the reference to a "transparent" window indicates that the window does not entirely obscure the content window below it, although it may partially obscure it. In one embodiment discussed below, the entirety of the window other than the watermark itself may be invisible to the user. However, the techniques presented are not limited in this respect, as the transparent window may take other forms (e.g., a color that taints the content below but allows it to show through) that enable the underlying content window to show through it.

In one embodiment, the transparent window may be a window on a display screen of a computer system that may not possess a border, menu, or scrollbar and may have a transparent background. Text and/or graphics may be rendered via the transparent window so that the text and/or graphics may overlay any other window rendered behind the transparent window (e.g., a window having content rendered thereon). The text and/or graphics rendered via the transparent window may have any level of transparency, including some of the text and/or graphics being entirely opaque or partially transparent. Furthermore, different text and/or graphics may have different levels of transparency.

Figure 7:
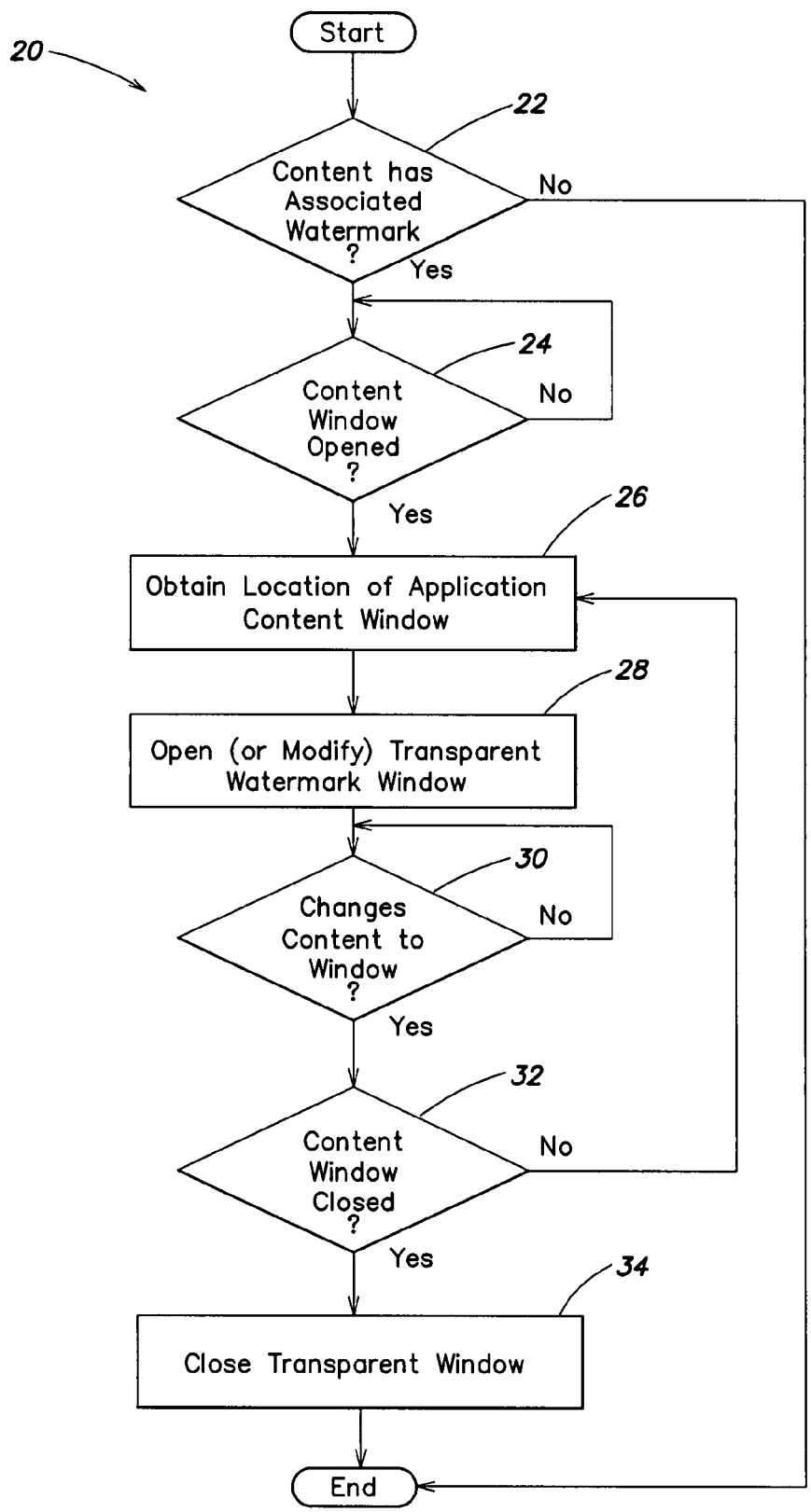
FIG. 7 is a process flow diagram illustrating how a watermark is rendered using a transparent window according to one embodiment.

An illustrative process 20 for implementing the transparent window is shown in FIG. 7. This process is illustrative, as the embodiment that relates to the use of a transparent window is not limited to any particular implementation technique.

Process 20 may be performed by one or more programs executing on a viewing device (e.g., a client computer or other computer having or coupled to a display) being used to view a content unit. Process 20 may be performed by a watermark tool which may be executing separately from the application rendering the content window. In one embodiment, process 20 may be performed by a computer system including a digital rights management system. As should appreciated, process 20 need not be performed on solely one computer and can be distributed amongst multiple computers in a system.

A component executing the process 20 may monitor the rendering of content by one or more applications and determine whether a watermark should be rendered for one or more content units (act 22). The determination of whether a watermark should be rendered for a content unit may be performed in any suitable manner, as the techniques described herein are not limited in this respect. In one embodiment, a server (e.g., a digital rights management policy server) may be queried with a unique content identifier for the content. The server may access a data store (e.g., a database) that may store information specifying whether a watermark should be rendered with the content unit (e.g., as identified by its unique identifier). When a determination is made that a watermark should not be rendered for the content (in act 22) the process may terminate.

When a determination is made that a watermark should be rendered with the content (in act 22), process 20 may proceed to monitor whether a content window is being, or has been, opened (e.g., by the application rendering the content) (act 24). This can be done in any suitable way. For example, many operating systems provide system APIs that can be used to fulfill this purpose.

Once a determination is made that an application content window is being opened, or has been opened, the process may proceed to obtain the location of the application content window in any suitable manner (act 26). For example, obtaining the location of the application content window may include obtaining coordinates for a corner point of the application content window and the size (e.g., length and width) of the application content window. It should be appreciated that this is just one example of a technique by which the location of an application content window may be obtained, as the techniques presented herein are not limited in this respect. Obtaining the location of the content window may be performed in any suitable way. For example, the system APIs provided by many operating systems can be used to gather such information.

Once the position information for the content window is obtained, process 20 proceeds to act 28 wherein it opens a transparent window including a rendering of a watermark for the content such that the transparent window overlays at least a portion of the content window. Opening a transparent window having the watermark may be accomplished in any suitable fashion, an example of which includes via calling one or more system APIs provided by the operating system of the machine controlling the display.

The watermark may be obtained and rendered in any suitable manner, as the techniques described herein are not limited in this respect. For example, a watermark for the content may have previously been defined and stored in a manner whereby it is associated with the content. Thus, information defining the attributes of the watermark may be stored and pasted to the process 20 so that the watermark may be rendered in the transparent window opened in act 28. As another example, the techniques described herein may be used with a system (e.g., a DRM system) that in response to a rendering of a content unit dynamically determines a watermark for the content unit. When used with such a system, information defining the attributes of the dynamically generated watermark may be passed to the process 20 for rendering in act 28.

The transparent window having the watermark may be displayed over at least a portion of the application content window such that a user viewing the content may perceive the watermark to be part of the content. The rendering of the watermark via a transparent window may be transparent to the application rendering the content window, such that the application rendering the content window is not aware of the rendering of the watermark via the transparent window. Alternatively, an indication that the watermark is being rendered may be provided to the application rendering the content. In one embodiment, the rendering of the watermark via the transparent window is outside the control of the application rendering the content window, such that the rendering of the watermark cannot be cancelled or otherwise influenced by the application rendering the content or a user thereof.

Process 20 may continuously monitor the content window for any changes that may be applied to the application content window (act 30). Such changes to the application content window may include resizing and/or reshaping of the application content window, minimization of the application content window, maximization of the application content window, relocation of the application content window within the display, and/or closing of the application content window. The monitoring of changes to the application content window may be accomplished in any suitable manner (e.g., via calls to one or more system APIs made available by the operating system of the viewing device).

When a determination is made that a change has been applied to the application content window, the process may determine whether the change(s) included closing the application content window (act 32). If a determination is made that the application content window has been closed, the process may proceed to act 34 to close the transparent window having the watermark. The closing of the transparent window may be accomplished in any suitable manner (e.g., via system API calls). The process may then terminate.

When a determination is made that the change applied to the content window does not include the closing of the application content window (act 32), the process may return to act 26 to obtain updated information on the location, size, shape and/or state of the content window (act 26). Examples of the state of the content window may include whether the content window is minimized, however this is just one example of a state for the window, as the techniques presented herein are not limited to detecting any particular state information.

The process then proceeds to act 28 to modify the transparent window having the watermark such that the transparent window can continue to be displayed with the application content window. The transparent window can be modified to track the changes (e.g., in location, size, shape and/or state) applied to the content window, thereby ensuring that the watermark is perceived to remain at the same location relative to the rendered content. If the content window is resized, the transparent window can be resized in a similar manner. If the content window is relocated to a new location on the display, the transparent window may be relocated in a similar manner. If the content window is minimized, the transparent window can be minimized so that the watermark is no longer viewable by the user. The process may continue to monitor any changes applied to the application content window, as previously described for acts 30, 32 and 34, and to apply similar changes to the transparent window in acts 26 and 28. The process can proceed in this manner until it is determined in act 32 that the application content window is closed, wherein the transparent window is also closed in act 34 and the process terminates.

Illustrative DRM System

As previously described, the above techniques may be used with digital rights management systems that control access to digital content. An access control policy can control, for example, which users may access particular units of content, when particular users may access particular content, from what devices particular users may access protected content, what particular users may do with that content (e.g., read, modify, copy, save, print), and whether particular users may be limited to accessing content having a watermark rendered over it (e.g., by physically printing a watermark when a unit of content is printed, by applying a watermark on a display screen when a unit of content is displayed, etc.) or not.

As discussed above, according to some embodiments presented herein, a digital rights management server (such as a policy server on which centralized content policies are created and enforced) may work with or incorporate a watermarking process employing the techniques described herein to facilitate policy-based watermarking. This enables an enterprise administrator or other permitted entity to centrally apply a printed or visual watermark on content, e.g., to communicate data classification and deter unauthorized forwarding and copying by recipients.

Figure 8:
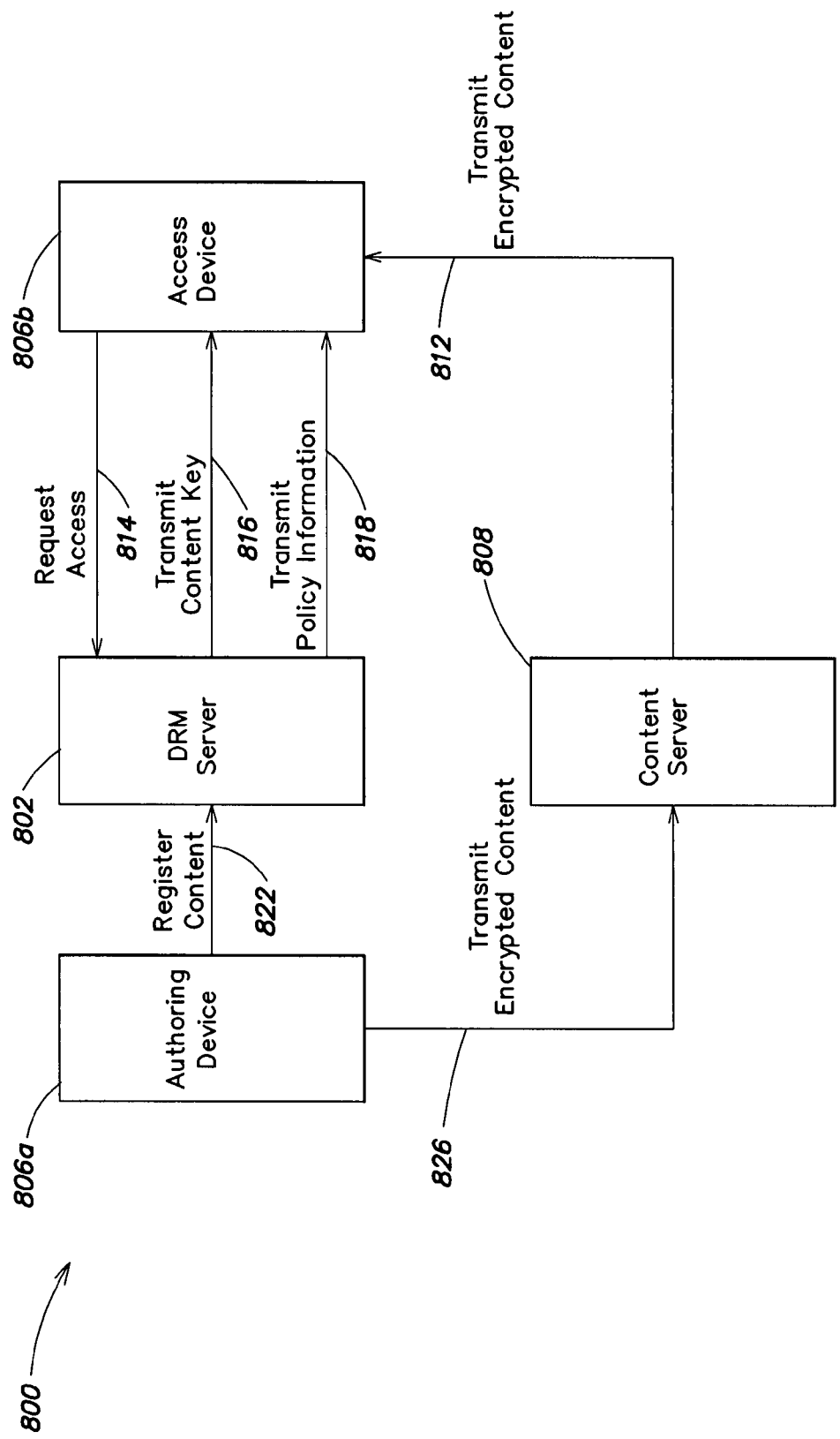
FIG. 8 is a block diagram of a prior art digital rights management system.

FIG. 8 is a block diagram of an illustrative prior art digital rights management (DRM) system 800 with which the techniques described herein can be employed. This DRM system is described merely for illustrative purposes, and it should be understood that the watermark rendering techniques described herein are not limited to being used with a DRM system of the type shown in FIG. 8, or with a DRM system at all. System 800 includes a DRM server 802, an authoring device 806a, an access device 806b, and a content server 808. Numerous types of electronic content may be managed using the DRM system 800, examples of which are described above. Each type of content may be created and/or viewed by one or more particular types of application programs.

The DRM scheme implemented by system 800 may encrypt protected content to prevent unauthorized access. The DRM scheme may further implement a scheme to ensure that only authorized users gain access to the information necessary to decrypt the protected content, and only in a manner that enables each user to access the content and perform the actions with that content that they are authorized to perform consistent with the access control policy for that content.

DRM server 802 performs several functions associated with the digital rights management of protected content. An encryption key is generated (e.g., by the DRM server, the authoring device or otherwise). The DRM server 802 maintains decryption keys for protected content (also referred to as content "registered" with the DRM system), maintains decryption keys for registered encrypted content, authenticates requests for viewing registered content, and grants access to registered content by providing decryption keys and associated access policies to authorized users. The DRM server may maintain a secure central database which provides an association between registered users that created or authored the registered content, the registered content, decryption keys for the registered content, access policies for the registered content, and registered users authorized to access each unit of protected content.

Content server 808 may generate and/or store units of content that may be managed by the DRM system. Content server 808 may have one or more application programs to generate various types of content (e.g., an email exchange server application, a word processing application, an image generation application, etc.). Content on content server 808 may be created and/or modified in response to user actions on an authoring device (e.g., authoring device 806a). A software plug-in (not shown) for the DRM system may be installed on the authoring device and may allow the selection of an option to protect a unit of content when it is opened or created on the access device in response to a user's actions. The plugin can connect to the DRM server over a secure communication link (e.g., via an SSL connection), and the user can be authenticated by the DRM server through a user interface presented by the plugin. The DRM server may connect to one or more resources in a networked computer system (e.g., a directory service storing authentication information such as a user name and password), so that the user may be authenticated based upon information provided via the plugin user interface, to the DRM server.

Once authenticated, the DRM user interface allows the authenticated user to set a policy to protect the unit of content. The user may select a pre-defined policy or create a new one. The policy may specify any of the control criteria discussed above (e.g., which user(s) may access the content, when the content may be accessed, from where the content may be accessed (e.g., only local network access), what actions may be performed with the content (e.g., printing, copying, modifying), whether a watermark should be applied to the content, etc.).

A unique identifier is created for the content (e.g., by applying a hashing algorithm to the content), in association with a request to register the content with the DRM server that is sent 822 by the authoring device 806a. In response, a content encryption key is generated. The content is encrypted using the content encryption key and sent 826 to the content server 808 where it is stored along with the unencrypted unique identifier for the content, and an unencrypted address for the DRM server 802. The DRM server 802 stores the policy and the content encryption key, and associates them with the content via the unique identifier for the content in any suitable way. In one embodiment, the unique identifier and the unencrypted address of the DRM server may be embedded in the content (e.g., in an unencrypted portion of the content).

When a user attempts to access the protected content using an access device 806b, the encrypted content is transmitted 812 from the content server 808 to the access device 806b, along with the unencrypted address of the DRM server 802 and the unencrypted unique identifier for the content. The access device can then use the unencrypted address of the DRM server to request access to the protected content associated with the unique content identifier, as described further below.

Access device 806b is a device through which a user may seek to access a protected unit of content. For example, if the content server 808 is a word processing server, a user may attempt to access a protected word processing document on the word processing server via an access device (e.g., a workstation). The protected unit of content may be transmitted 812 from the content server 808 to the access device 806b (e.g., via a network connection). As discussed above, the protected content is encrypted, so that the user utilizing the access device 806b cannot access it without authority granted by the access policy that is associated with the protected unit of content and is stored on the DRM server 802.

When a user on access device 806b seeks access to a protected content unit, it can only gain access by retrieving the content key from the DRM server 802. If the access device 806b has a DRM plugin installed, the plugin issues a communication 814 to the DRM server 802 (e.g., using the address associated with the content) to request access to the protected unit of content. If no plugin is installed, information within the content may point the device to a server from which the DRM plugin may be installed. The DRM server 802 determines whether the user using the access device 806b is authorized to access the specified unit of content. If not, the access request is denied. If the user is authorized, the content decryption key is transmitted 816 from the DRM server 802 to the access device 806b. This content key may be encrypted using a communication session key for the transaction between the access device and the DRM server so as to keep it secure. The content key may be used to decrypt the unit of content so as to generate a decrypted unit of content which may be accessed by the user. However, the DRM server 802 further transmits 818 policy information to the access device, which dictates the actions the user may perform on the unit of content. The DRM software plugin installed on the access device enforces the policy.

When used on a system such as that shown in FIG. 8, the techniques described above for rendering a watermark via a tool separate from the application rendering the content can be implemented in any suitable manner. In one embodiment, the watermark rendering tool can execute on access device 806b (e.g., via client plug-in).

It should be understood that the transparent window embodiment(s) and hooking function embodiment(s) are just examples of techniques that can be employed to render watermarks outside of the application rending the content, and that other implementations are possible.

As should be appreciated from the foregoing, numerous techniques described herein can be used independently of one another. Thus, while in some embodiments all of the above-described features can be used together, any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method for use in a computer system, the method comprising:
   receiving a call from an application to render a content unit;
   receiving a watermark definition from a server;
   generating a watermark according to the watermark definition with a separate watermarking tool in response to the call to render the content unit, wherein the watermark is generated by the watermarking tool independent of the content unit being rendered and is not part of the content unit being rendered;
   rendering the watermark together with the content unit, wherein the watermark being rendered does not replace any portion of the content unit being rendered; and
   sending, to the server, information regarding the watermark and the content unit.

2. The method of claim 1, wherein the rendering of the watermark is outside the control of the application and a user of the application.

3. The method of claim 1, wherein the rendering comprises at least one display operation or one print operation.

4. The method of claim 1, wherein the computer system comprises a digital rights management (DRM) system, wherein the content unit is a protected content unit managed by the digital rights management system, and wherein the rendering of the watermark is initiated by the DRM system.

5. The method of claim 4, wherein the DRM system comprises the watermark tool.

6. The method of claim 1, wherein the computer system comprises a digital rights management system that manages data defining the watermark for the content unit.

7. The method of claim 1, wherein the watermark is rendered over or under the content unit.

8. The method of claim 7, wherein the watermark and content unit are rendered as separate windows on a display, wherein the watermark is rendered in an otherwise transparent window.

9. The method of claim 1, wherein upon receiving the call to render a content unit, the call is intercepted and modified by the watermark tool.

10. At least one computer for use in a computer system, the at least one computer comprising:
    at least one processor programmed to receive a call from an application to render a content unit, receive a watermark definition from a server, generate a watermark according to the watermark definition with a separate watermarking tool in response to the call to render the content unit, wherein the watermark is generated independent of the content unit being rendered and is not part of the content unit being rendered, render the watermark together with the content unit, wherein the watermark being rendered does not replace any portion of the content unit being rendered, and send, to the server, information regarding the watermark and the content unit.

11. The computer of claim 10, wherein rendering the watermark is outside the control of the application and a user of the application.

12. The computer of claim 10, wherein the rendering of the content and the watermark comprises at least one display operation or print operation.

13. The computer of claim 10, wherein the computer system comprises a digital rights management (DRM) system, wherein the content unit is a protected content unit managed by the digital rights management system, and wherein generating the watermark is initiated by the DRM system.

14. The computer of claim 10, wherein the computer system comprises a digital rights management system that manages data defining the watermark for the content unit.

15. A computer program product, comprising a non-transitory computer usable medium having computer readable program code embodied therein, the computer readable program code adapted to be executed to implement a method for use in a computer system for watermarking content, comprising:

receiving a call from an application to render a content unit;

receiving a watermark definition from a server;

generating a watermark according to the watermark definition with a separate watermarking tool in response to the call to render the content unit, wherein the watermark is generated by the watermarking tool independent of the content unit being rendered and is not part of the content unit being rendered;

rendering the watermark together with the content unit, wherein the watermark being rendered does not replace any portion of the content unit being rendered; and sending, to the server, information regarding the watermark and the content unit.

16. The computer program product of claim 15, wherein the rendering of the watermark is outside the control of the application and a user of the application.

17. The computer program product of claim 15, wherein the rendering comprises at least one display operation or one print operation.

18. The computer program product of claim 15, wherein the computer system comprises a digital rights management (DRM) system, wherein the content unit is a protected content unit managed by the digital rights management system, and wherein the rendering of the watermark is initiated by the DRM system.

19. The computer program product of claim 15, wherein the computer system comprises a digital rights management system that manages data defining the watermark for the content unit.

* * * * *